Patented Dec. 20, 1949

2,491,789

UNITED STATES PATENT OFFICE 2,491,789

ALKALI METAL PERBORATES

James H. Young, Niagara Falls, N. Y., assignor to E. I. du Pont de Nemours & Company, Wilmington, Del., a corporation of Delaware No Drawing. Application October 23, 1946, Serial No. 705,240

16 Claims. (Cl. 252—186)

This invention relates to solid compounds which contain peroxide or active oxygen. More particularly the invention relates to compounds of the type known as perborates.

This application is a continuation-in-part of my application, Serial No. 590,969, filed April 28, 1945 (now abandoned).

The usual method for producing perborates is to react solutions of borax, an alkali such as caustic or sodium peroxide, and hydrogen peroxide at low temperatures. Crystals of sodium perborate tetrahydrate separate because of low solubility in cold water. The product is dried to give the usual article of commerce which is $NaBO_3.4H_2O$ or more probably $NaBO_2.H_2O_2.3H_2O$.

This so-called tetrahydrate contains about 10% of active oxygen. It softens and melts with concomitant decomposition at temperatures above about 40° C. It has been proposed to further dehydrate these tetrahydrate crystals to give the so-called monohydrate which chemically is $NaBO_3.H_2O$ or more probably $NaBO_2.H_2O_2$. This product contains about 15% of active oxygen. Dehydration of the tetrahydrate has not been an economical process because the low melting point of the tetrahydrate requires large volumes of air, the product dusts from the dryer, and decomposition losses are appreciable.

Since there are no absolutely stable peroxygen compounds it is very important to produce compounds which, in storage, over a wide temperature range, show minimum losses of active oxygen.

An object of this invention is to provide a simple and inexpensive method for making perborates. Another object is to provide a method for preparing alkali metal perborates having properties distinctly different from and markedly more desirable than those of perborates heretofore known. Still further objects will be apparent from the following description.

The above objects are accomplished in accordance with the invention by mixing at least one boron compound from the group consisting of boric acids and alkali metal salts thereof with hydrogen peroxide and an alkali such as an alkali metal peroxide or an alkali metal hydroxide, and sufficient water to cause reaction to occur between the boron compound and the peroxide and to form a substantially homogeneous solution of the mixture at a reaction temperature in excess of at least 40° C. and preferably not higher than about 60° C. After reaction, the solution is subjected to rapid drying.

Experiments have shown that when carrying out the present method employing a reaction temperature as indicated above and when properly proportioning the reactants, there are obtained perborate products which differ markedly in properties from perborates prepared by prior methods and which are believed to be different structurally from prior products.

The sodium perborate tetrahydrate of commerce is usually prepared employing reactants in amounts corresponding to $Na_2O$:Active $O$:$B_2O_3$ ratios of 1:2:1. The reaction is conventionally carried out at around 10 to 20° C. and the reaction mixture is then cooled still further to crystallize out the product which is then air dried at temperatures below 40° C. (See Carveth U. S. Patent 1,716,874.) The crystalline product is only slightly soluble in cold water and dissolves relatively slowly. While fairly stable at ordinary temperatures, it is unstable at higher temperatures such as 60° C.

Sodium perborate monohydrate prepared by dehydration of the tetrahydrate is a non-crystalline product which is somewhat more stable at 60° C. but resembles the tetrahydrate, to which it reverts, in the presence of water. Previous attempts have been made to obtain a completely dehydrated product, but it was found that as dehydration progresses beyond the monohydrate stage oxygen is lost and a fundamental change in structure occurs whereby a product is formed which evolves gaseous oxygen instead of active oxygen when dissolved in water.

In contrast, the present improved products are non-crystalline and have a glassy appearance. In general they dissolve much more rapidly than perborate tetrahydrate at ordinary temperatures and are much more soluble. They exhibit excellent stability even at 60° C. which is surprising since by the method of preparation all impurities in the raw materials are retained in the products since no separation by crystallization and filtration, which would have a purifying effect, is involved. The exact chemical structures have not been determined although analyses indicate that the present products probably are intimate mixtures or molecular combinations of compounds including $NaBO_2.H_2O_2$ and $NaBO_3$. Their non-crystalline, glassy appearance suggests that they are solid solutions.

Throughout the specification and in the appended claims the proportions of starting materials are stated, unless specifically indicated otherwise, in terms of their total chemical equivalents of $M_2O$ (where M stands for an alkali metal) or $Na_2O$, $B_2O_3$, $H_2O_2$ (or active oxygen) and $H_2O$. Likewise, the products are described in terms of their total chemical equivalents of $M_2O$ or $Na_2O$, $B_2O_3$, $H_2O$ and active oxygen.

The present method may be practiced employing the reactants in proportions which may be varied considerably. Thus, the amounts of the reactants may be proportioned to correspond with $Na_2O$:Active $O$:$B_2O_3$ ratios of 1:2:1, as in the preparation of sodium perborate tetrahydrate by previous methods. In that case, however, substantial loss of active oxygen results due to the use of the higher reaction temperature which is characteristic of the present method. It is preferred that the reactants be proportioned so as to correspond to from 0.53 to 0.97 mole of $Na_2O$ per mole of $B_2O_3$ and from 0.5 to 2.5 atoms of active oxygen per mole of $B_2O_3$. When the reactants are so proportioned, the present improved products are obtained with high active oxygen recoveries.

The invention is further illustrated by the following examples:

Example 1

36 grams of solid sodium peroxide (0.46 mole) were mixed by stirring with 190 grams borax decahydrate (0.50 mole). This mixture was added portion-wise over about 10 minutes to 150 grams of 130 vol. hydrogen peroxide containing 3 grams of borax (1.5 moles $H_2O_2$) which was stirred and cooled to maintain a temperature of 40–43° C. After 5 minutes stirring 1 ml. of 42 Bé sodium silicate ($Na_2O=10\%$ $SiO_2=25\%$ $H_2O=65\%$) was added and stirring continued at 43 to 45° C. for 10 minutes.

378 grams of this solution was charged by slowly flowing onto a drum dryer having stainless steel rolls. These rolls were heated at 20–25 lbs. steam pressure. The product on the rolls was at 124° C. The roll clearance was 0.007 to .009″, and they were revolving at 4.5 R. P. M.

189 grams of a white flaky product containing 15.97% active oxygen and showing a 95% recovery of the active oxygen put in was recovered.

After 6–8 months at 25–35° C., analysis of the product showed: 15.65% active oxygen, 15.03% $H_2O$ (including the $H_2O$ equivalent of any $H_2O_2$ present), 31.27% $Na_2O$ and 37.18% $B_2O_3$. The ratio of moles of $H_2O$ per atom of active oxygen was 0.855; the ratio of moles of $Na_2O$ per mole of $B_2O_3$ was 0.943; and the ratio of atoms of active oxygen per mole $B_2O_3$ was 1.83.

Example 2

A reaction was conducted as in Example 1 but without added sodium silicate. Drying was substantially the same.

187 grams of product containing 16.1% active oxygen and with a recovery of 94.8% of the active oxygen put in was recovered.

After 6–8 months at 25–35° C., analysis of the product showed: 16.0% active oxygen, 14.66% $H_2O$, 31.15% $Na_2O$ and 37.70% $B_2O_3$. The ratio of moles of $H_2O$ per atom of active oxygen was 0.814; the ratio of moles of $Na_2O$ per mole of $B_2O_3$ was 0.930; and the ratio of atoms of active oxygen per mole of $B_2O_3$ was 1.85.

Example 3

The reaction was conducted as in Example 1 but with no added silicate.

The product was dried with the roll clearance at 0.004 to 0.005″, roll temperature of 146° C. and product temperature of 127° C. The time for drying the batch was 3 minutes.

189 grams of product containing 16.03% active oxygen at 95.3% turnover was recovered.

After 6–8 months at 25–35° C., analysis of the product showed: 15.82% active oxygen, 15.34% $H_2O$, 31.54% $Na_2O$ and 37.20% $B_2O_3$. The ratio of moles of $H_2O$ per atom of active oxygen was 0.861; the ratio of moles of $Na_2O$ per mole of $B_2O_3$ was 0.953; and the ratio of atoms of active oxygen per mole of $B_2O_3$ was 1.85.

Example 4

190.5 grams of borax decahydrate (0.5 mole) was added slowly to 79.4 ml. of 130 vol. hydrogen peroxide (0.92 mole $H_2O_2$) with good stirring. 8 grams solid sodium peroxide (0.12 mole) was added slowly with cooling to maintain a temperature of not over 50° C. The mixture was stirred one hour. It was then poured over the rolls of a drum dryer heated with 16 lbs. steam.

138 grams of product containing 10.8% active oxygen with a recovery of 91% of the active oxygen was obtained.

Example 5

381 grams of borax decahydrate (1 mole) was mixed with 64 grams of solid sodium peroxide (0.82 mole) and added to 300 grams of 130 vol. hydrogen peroxide (3 moles $H_2O_2$) and the mixture processed as in Example 1.

353 grams of product containing 16.63% active oxygen and showing a 94.8% recovery of active oxygen was obtained.

Example 6

A mixture of 469.5 lbs. of borax and 87.5 lbs. of sodium peroxide together with 391.5 lbs. of 130 vol. hydrogen peroxide was fed continuously into a stirred and jacketed stainless steel reaction vessel maintained at 46–50° C. The solution was continuously overflowed onto a 2 roll drum dryer having cast iron rolls maintained at 145–150° C. Analysis of the product indicated a recovery of about 93% based on active oxygen input.

A sample of the product obtained during the above run analyzed 18.69% active oxygen, 13.85% $H_2O$, 30.18% $Na_2O$ and 36.88% $B_2O_3$. The ratio of moles of $H_2O$ per atom of active oxygen was 0.66; the ratio of moles of $Na_2O$ per mole of $B_2O_3$ was 0.919; and the ratio of atoms of active oxygen per mole of $B_2O_3$ was 2.21.

Example 7

By similar processing and by suitably adjusting the ratios of $H_2O_2$ to borax and sodium peroxide, compositions containing 17.27, 18.60, 19.22 and 20.67% active oxygen were made. Recoveries and stabilities were good.

The reaction should be carried out at a temperature of at least 40° C. and preferably not over 60° C. At higher temperatures, recovery of active oxygen is poor and at lower temperatures perborate tetrahydrate tends to form and crystallize out. The preferred temperature is 45 to 55° C. The temperature employed will depend to some extent upon the amount of total water (including water of crystallization and the water equivalent of hydrogen peroxide) present in the mixture as well as upon the rate at which the mixture after completion of the reaction is transferred to the dryer. In all cases, the substantially homogeneous reaction solution should be maintained at such a temperature as will avoid crystallization prior to evaporation.

Suitable boron compounds for use are ortho- and pyroboric acids, boric anhydride ($B_2O_3$) and the alkali metal salts of such acids. The term "boric acid" is used throughout the specification and in the claims to mean either of the above acids or boric anhydride. In preparing a sodium perborate, it is preferred to use borax $$(Na_2B_4O_7.10H_2O)$$

as starting material although the anhydrous tetraborate, or the tetraborate in any degree of hydration may be used successfully. The starting material may be primarily a metaborate, in which case it will be preferred to employ therewith smaller quantities of a tetraborate or boric acid for reasons which will subsequently be apparent.

I prefer to employ an alkali metal peroxide such as sodium peroxide as the required alkali, since such a compound will also supply part of the active oxygen requirements. However, the invention may be practiced successfully employing only an alkali metal hydroxide, in which event larger quantities of hydrogen peroxide will be used.

It is preferred to so proportion the reactants that the reaction mixture will contain the equivalent of 0.53 to 0.97 mole of $M_2O$ ("M" stands for an alkali metal) per mole of $B_2O_3$, including the $M_2O$ and $B_2O_3$ equivalents of all alkali metal and all boron compounds used. Best results are achieved using reactant proportions corresponding to 0.8 to 0.95 mole of $M_2O$ per mole of $B_2O_3$.

The amount of active oxygen added to the reaction mixture, either as hydrogen peroxide or as alkali metal peroxide, may be varied widely. However, if the active oxygen used is equivalent to less than about 0.5 atom per mole of $B_2O_3$, the resulting product will contain such a low concentration of active oxygen that it will be of little value commercially. Use of the equivalent of from 0.5 to 2.5 atoms of active oxygen per mole of $B_2O_3$ is recommended and best results are obtained when using from 1.8 to 2.2 atoms per mole of $B_2O_3$.

As stated previously there should be sufficient water present in the reaction mixture to cause the reaction to occur and to form a homogeneous solution at the desired reaction temperature. An excess of water is not particularly harmful except that more water must be evaporated in obtaining the final dry product. Reaction mixtures containing total water (including water of crystallization and the water equivalent of $H_2O_2$, assuming complete decomposition according to the equation: $2H_2O_2 \rightarrow 2H_2O + O_2$) equivalent to 7.5 to 60 moles per mole of $B_2O_3$ may be used although mixtures containing from 8 to 12 moles of water per mole of $B_2O_3$ are preferred.

The process of the invention represents a distinct advance over the prior art in that the ratio of alkali to $B_2O_3$ and of active oxygen to $B_2O_3$ in the final product can be regulated as desired. When, as formerly, the product was recovered from solution by crystallization at low temperatures, but one product, sodium perborate tetrahydrate, was obtained because of its insolubility. The present method may, of course, be used to obtain products from reaction mixtures such as those employed in prior methods for the production of perborate tetrahydrate. However, substantial active oxygen losses result when such mixtures are processed by the present method and the method gives best results and better products when employing reaction mixtures in which the reactants have been proportioned as indicated above.

When proportioning the reactants as indicated above the present method yields non-crystalline glassy appearing products. They are outstandingly more stable than sodium perborate tetrahydrate or monohydrate, particularly at elevated temperatures; are much more soluble in water; and dissolve at a more rapid rate. Their active oxygen contents will correspond roughly to the amount of active oxygen employed in their preparation. Products containing over 20% by weight of active oxygen may be obtained but those having 15 to about 17% are preferred. As the active oxygen content is increased above about 17%, solubility tends to decrease and above about 22% stability decreases somewhat although products containing such high active oxygen content can be obtained in accordance with the invention.

The dried products, of course, contain some water present either as water of crystallization or as hydrogen peroxide of crystallization. In general the water content, including the $H_2O$ equivalent of any chemically bound $H_2O_2$, will be not higher than about 2 moles of water per atom of active oxygen present. In most of the products, there will be from 0.4 to 1.05 moles of total water per atom of active oxygen. Products containing more than about 15% active oxygen will, when thoroughly dry, contain substantially less than 1 mole of water, e. g., not more than 0.9 mole, per gram atom of active oxygen.

The ratio of $M_2O$ to $B_2O_3$ in the product will, of course, be the same as in the reaction mixture since the dry product is obtained by evaporation to dryness of the reaction mixture.

The reaction is exothermic and cooling should be supplied while mixing the reactants.

In order to economize on the cost of removing water, it is preferable to use relatively concentrated solutions of hydrogen peroxide. The so-called 130 volume hydrogen peroxide of commerce which contains about 35% $H_2O_2$ by weight is satisfactory. Hydrogen peroxide solutions which contain between 25% and 50% $H_2O_2$ can be employed.

In order to increase stability in storage and in solution, small amounts of sodium pyrophosphate ($Na_4P_2O_7$) or of sodium silicate and magnesium sulfate may be added as stabilizers. For example, 1.0% sodium pyrophosphate or 0.5% sodium silicate with 0.2% magnesium sulfate may be added to the hydrogen peroxide before adding the borax and sodium peroxide. Use of such stabilizers is particularly advantageous when preparing products which are not thoroughly dried or products containing high active oxygen content.

It is desirable to prevent the system from becoming too alkaline at any stage of the process. This may be accomplished by first adding the borax to the hydrogen peroxide solution and then adding the sodium peroxide. The borax and sodium peroxide may be fed simultaneously. All three reactants may be fed continuously and the reaction mixture continuously withdrawn and dried.

As with practically all peroxides, heavy metal contamination is undesirable. Suitable reactors may be stainless steel, glass, ceramic ware, or enameled metal.

After the reaction is complete and all reactants are in solution, the slightly viscous, syrup-like solution is flowed onto a drum dryer, preferably having cast iron, stainless steel or chromeplated rolls. The temperature of the rolls may be about 100 to 150° C. depending upon the speed of roll rotation and how fast product is being flowed on the rolls. If thoroughly dry a white flaky product is removed. Partly dry products are more or less pasty and sticky. Rather complete drying is necessary to obtain a product of maximum storage stability. As a control measure an analysis of the product for water and active oxygen will show whether the product is dry. An excess of more than 5% H₂O over that required to be equivalent to the H₂O₂ as determined by the active oxygen present will lower thermal stability at elevated storage temperatures.

The effect of water content on the stability at 60° C. of products prepared as illustrated in the above examples is shown in the following table:

| Sample | Orig. Act. O Content Per Cent | Ratio Moles H₂O: Atoms Act. O | Per Cent of Orig. Act. O Lost in 6 Weeks |
|---|---|---|---|
| A | 15.41 | 1.02 | 5.82 |
| B | 15.82 | 1.01 | 3.26 |
| C | 15.65 | 1.06 | 2.77 |
| D | 15.62 | 0.84 | 0 |

Even the least stable of the above products is markedly more stable than ordinary sodium perborate tetrahydrate or the monohydrate prepared therefrom as is shown below.

The drying temperature may, of course, be lowered considerably by drying under reduced pressure. However, use of a drum dryer at atmospheric pressure with the drying surfaces at a temperature of 100 to 150° C. is very practical and preferred. Rapid drying is desired, particularly when using drying surfaces at a temperature above about 100° C. Employing such temperatures, best results are achieved when drying (i. e., removal of substantially all water not present as combined water or hydrogen peroxide of crystallization) is accomplished within 2-3 minutes and preferably less than 1 minute. At lower temperatures, e. g., at 60 to 100° C., longer drying times are possible but in general should not exceed about one hour. Spray drying may be employed, thus the solution of the reaction mixture may be contacted in finely divided form with a stream of dry heated air. For example, the solution may be sprayed into a stream of dry hot air whereby finely divided solid dry particles are rapidly formed and may be recovered from the air stream by known means.

Isolation of the product is accomplished by the continued application of heat to the syrup-like solution of reaction products until evaporation of water therefrom as a result of the heat applied leaves the product in the form of a dry residue. As stated previously, evaporation at a temperature above the boiling point of water is preferred and rapid drying may be readily accomplished with excellent results at atmosphere pressure by the use of a drum dryer whose drying surfaces are maintained at a temperature above 100° C. but not exceeding about 150° C.

It is not possible to dissolve more than about 4 parts of the ordinary sodium perborate tetrahydrate of commerce, as prepared by the method of Carveth U. S. Patent 1,716,874, in 100 parts of water at 30° C. Sodium perborate monohydrate prepared from the above tetrahydrate by dehydration in a rotary dryer at a temperature beginning at about 40° C. and rising to 90° C., rapidly reverts to the tetrahydrate upon the addition of water and then behaves as the tetrahydrate.

In contrast, the present preferred products, for example, those of Examples 1, 2 and 3, readily dissolve completely in 1.5 to 3 times their weight of water at 30° C. Some heat is evolved. The resulting solutions are meta stable and will in times which may vary from 5 or 10 minutes to an hour or more, gradually deposit sodium perborate tetrahydrate to give a solid mass of moist crystals. The transition from the products of this invention to perborate tetrahydrate is accompanied by a very considerable heat evolution showing a very definite chemical change.

The following table shows the relative stability of the products of this invention and of perborate tetrahydrate and monohydrate produced by former methods.

| Product | Orig. Act. O Content, Per Cent | Per Cent of Orig. Act. O Lost at 60° C. in— | | | |
|---|---|---|---|---|---|
| | | 2-5 Days | 7 Weeks | 12 Weeks | 16 Weeks |
| Perborate Tetrahydrate | 10.2 | 75-90 | | | |
| Perborate Monohydrate | 15.2 | | ¹35 | | |
| Product of Example 1 | 15.97 | | 0.94 | 2.51 | 5.16 |
| Product of Example 2 | 16.1 | | 0.0 | 0.43 | 1.93 |
| Product of Example 3 | 16.03 | | 1.31 | 3.43 | 7.8 |

¹ This loss was in 6 weeks.

The "perborate tetrahydrate" of the above table was taken from a commercial lot of sodium perborate tetrahydrate prepared by the process described in Carveth U. S. Patent 1,716,874. The "perborate monohydrate" was made from the above perborate tetrahydrate by dehydration in a conventional rotary dryer at a temperature beginning at about 40° C. and rising to 90° C.

The perborate products obtained in accordance with the present invention are useful in bleaching, in soap powders, in dentifrices and for various other purposes. The high active oxygen content and excellent stability of the present improved products represent distinct advances over former compositions. The simplified processing renders the product less expensive and hence more widely useful.

I claim:

1. A process for the production of an alkali metal perborate product comprising mixing a boron compound from the group consisting of boric acid and the alkali metal salts thereof with hydrogen peroxide, and an alkali from the group consisting of the alkali metal peroxides and hydroxides with sufficient water to cause reaction to occur between said boron compound, hydrogen peroxide and alkali and to form a substantially homogeneous solution of the resulting mixture and applying heat so as to evaporate water from said homogeneous solution and leave as a residue a solid alkali metal perborate product.

2. A process for the production of an alkali metal perborate product comprising mixing together an alkali metal tetraborate, hydrogen peroxide, and an alkali from the group consisting of the alkali metal peroxides and hydroxides with sufficient water to cause reaction to occur between said boron compound, hydrogen peroxide and alkali and to form a substantially homogeneous solution of the resulting mixture and applying heat so as to evaporate water from said homogeneous solution and leave as a residue a solid alkali metal perborate product.

3. A process for the production of an alkali metal perborate product comprising mixing together an alkali metal tetraborate, hydrogen peroxide, and an alkali from the group consisting of the alkali metal peroxides and hydroxides with sufficient water to cause reaction to occur between said boron compound, hydrogen peroxide and alkali and to form a substantially homogeneuos solution of the resulting mixture and evaporating water from said homogeneous solution at a temperature above the boiling of water to leave as a residue a solid alkali metal perborate product.

4. A process for the production of an alkali metal perborate product comprising mixing together a sodium tetraborate, hydrogen peroxide, and an alkali from the group consisting of sodium peroxide and sodium hydroxide with sufficient water to cause reaction to occur between said boron compound, hydrogen peroxide and alkali and to form a substantially homogeneous solution of the resulting mixture and applying heat so as to evaporate water from said homogeneous solution and leave as a residue a solid sodium perborate product.

5. A process for the production of an alkali perborate product comprising reacting at a temperature of 40-60° C. a boron compound of the group consisting of boric acid and the alkali metal salts thereof with hydrogen peroxide and an alkali from the group consisting of the alkali metal peroxides and hydroxides in the presence of sufficient water to form a homogeneous solution of the reaction mixture, said reactants being so proportioned that there are present in the reaction mixture the equivalent of from 0.53 to 0.97 mole of $M_2O$, M standing for an alkali metal, and from 0.5 to 2.5 atoms of active oxygen per mole of $B_2O_3$, and evaporating water at a temperature above the boiling point of water from the resulting homogeneous solution of reaction product to leave as a residue a solid alkali metal perborate product.

6. The method of claim 5, wherein the reactants are a sodium tetraborate, hydrogen peroxide and sodium peroxide.

7. A process for the production of a sodium perborate product comprising reacting together a sodium tetraborate, hydrogen peroxide and sodium peroxide at a temperature of 40-60° C. in the presence of water, said reactants and water being present in the reaction mixture in amounts equivalent to 0.53 to 0.97 mole of $Na_2O$, 0.5 to 2.5 atoms of active oxygen and 7.5 to 60 moles of water per mole of $B_2O_3$, and evaporating water at a temperature above the boiling point of water from the resulting homogeneous solution of reaction product to leave as a residue a solid sodium perborate product.

8. A process for the production of a sodium perborate product comprising reacting together a sodium tetraborate, hydrogen peroxide and sodium peroxide at a temperature of 40-60° C. in the presence of water, said reactants and water being present in the reaction mixture in amounts equivalent to 0.8 to 0.95 mole of $Na_2O$, 1.8 to 2.2 atoms of active oxygen and 7.5 to 60 moles of water per mole of $B_2O_3$, and evaporating water at a temperature above the boiling point of water from the resulting homogeneous solution of reaction product to leave as a residue a solid sodium perborate product.

9. A process for the production of a sodium perborate product comprising reacting together a sodium tetraborate, hydrogen peroxide and sodium peroxide at a temperature of 45-55° C. in the presence of water, said reactants and water being present in the reaction mixture in amounts equivalent to 0.8 to 0.95 mole of $Na_2O$, 1.8 to 2.2 atoms active oxygen and 8 to 12 moles of water per mole of $B_2O_3$, and evaporating the resulting homogeneous solution of reaction product from a surface having a temperature of 100-150° C. to leave as a residue a solid sodium perborate product.

10. A solid alkali metal perborate product each particle of which is non-crystalline and contains in combined form 0.53 to 0.97 mole of alkali metal oxide and 0.5 to 2.5 atoms of active oxygen per mole of $B_2O_3$ and not more than 2 moles of combined water per atom of combined active oxygen.

11. A solid sodium perborate product each particle of which is non-crystalline and contains in combined form 0.53 to 0.97 mole of $Na_2O$ and 1.8 to 2.2 atoms of active oxygen per mole of $B_2O_3$ and not more than 2 moles of combined water per atom of combined active oxygen.

12. A solid sodium perborate product each particle of which is non-crystalline and contains in combined form 0.8 to 0.95 mole of $Na_2O$ and 1.8 to 2.2 atoms of active oxygen per mole of $B_2O_3$ and not more than 2 moles of combined water per atom of combined active oxygen.

13. A solid sodium perborate product each particle of which is non-crystalline and contains in combined form 0.53 to 0.97 mole $Na_2O$ and 0.5 to 2.5 atoms of active oxygen per mole of $B_2O_3$ and not more than 2 moles of combined water per atom of combined active oxygen.

14. A solid sodium perborate product each particle of which is non-crystalline and contains in combined form 0.8 to 0.95 mole of $Na_2O$ and 1.8 to 2.2 atoms of active oxygen per mole of $B_2O_3$ and from 0.4 to 1.05 moles of combined water per atom of combined active oxygen.

15. A solid non-crystalline sodium perborate having an active oxygen content of at least 15% by weight and less than one mole of combined water per atom of combined active oxygen.

16. A solid sodium perborate each particle of which is non-crystalline and contains in combined form 0.8 to 0.95 mole of $Na_2O$ per mole of $B_2O_3$ and less than 1 mole of water per atom of active oxygen, has an active oxygen content of 15 to 17% by weight and is completely soluble at 30° C. in 1.5 to 3 times its weight of water.

JAMES H. YOUNG.

REFERENCES CITED

The following references are of record in the file of this patent:

UNITED STATES PATENTS

| Number | Name | Date |
|---|---|---|
| 903,967 | Fritsche | Nov. 17, 1908 |
| 1,677,283 | Jones | July 17, 1928 |
| 1,716,874 | Carveth | June 11, 1929 |
| 2,065,744 | Reichert | Dec. 29, 1936 |
| 2,380,779 | Nees | July 31, 1945 |